(12) United States Patent
Wall (10) Patent No.: US 9,874,978 B2
(45) Date of Patent: Jan. 23, 2018

(54) PARTIAL DETECT MODE

(71) Applicant: Flatfrog Laboratories AB, Lund (SE)

(72) Inventor: Henrik Wall, Dalby (SE)

(73) Assignee: FLATFROG LABORATORIES AB, Lund (SE)

( * ) Notice: Subject to any disclaimer, the term of this patent is extended or adjusted under 35 U.S.C. 154(b) by 41 days.

(21) Appl. No.: 14/904,262

(22) PCT Filed: Jun. 10, 2014

(86) PCT No.: PCT/SE2014/050701
§ 371 (c)(1),
(2) Date: Jan. 11, 2016

(87) PCT Pub. No.: WO2015/005847
PCT Pub. Date: Jan. 15, 2015

(65) Prior Publication Data
US 2016/0154531 A1    Jun. 2, 2016

(30) Foreign Application Priority Data
Jul. 12, 2013   (SE) ...................................... 1350870

(51) Int. Cl.
*G06F 3/042* (2006.01)
*G06F 1/32* (2006.01)
(Continued)

(52) U.S. Cl.
CPC .......... *G06F 3/0421* (2013.01); *G06F 1/3262* (2013.01); *G06F 1/3296* (2013.01);
(Continued)

(58) Field of Classification Search
CPC .. G06F 3/0421; G06F 1/3296; G06F 3/04883; G06F 3/0416; G06F 1/3262; G06F 2203/04104; G06F 2203/04109
(Continued)

(56) References Cited

U.S. PATENT DOCUMENTS 3,440,426 A   4/1969  Bush
3,553,680 A   1/1971  Cooreman
(Continued)

FOREIGN PATENT DOCUMENTS

CN   201233592 Y   5/2009
CN   101644854 A   2/2010
(Continued)

OTHER PUBLICATIONS

International Search Report dated Nov. 6, 2014, in connection with PCT/SE2014/050701 filed Jun. 10, 2014.
(Continued)

*Primary Examiner* — Adam R Giesy
*Assistant Examiner* — Chineyere Wills-Burns
(74) *Attorney, Agent, or Firm* — Knobbe, Martens, Olson & Bear, LLP (57) ABSTRACT

The disclosure relates to a touch sensitive system comprising a touch sensitive panel defining a touch surface, a plurality of emitters configured to emit light into the panel for propagation in the panel, a plurality of detectors configured to detect the light propagating in the panel, a plurality of distributed control devices each configured to control operation of a segment of emitters and detectors, a main control unit configured to control the distributed control devices. The touch sensitive system is configured to be set in a partial detect mode in which mode a first of the distributed control devices is configured to be active and to control a first emitter to emit light in a partial region of the panel coincident with a partial area of the touch surface. The touch sensitive system is further configured to detect a predetermined gesture on the partial area of the touch surface, generate a gesture signal indicating the predetermined gesture, and activate a feature of the touch sensitive system in accordance with the predetermined gesture. The (Continued)

disclosure also relates to a method in connection with the touch sensitive system.

19 Claims, 5 Drawing Sheets

(51) Int. Cl.
  *G06F 3/041* (2006.01)
  *G06F 3/0488* (2013.01)
(52) U.S. Cl.
  CPC ........ *G06F 3/0416* (2013.01); *G06F 3/04883* (2013.01); *G06F 2203/04104* (2013.01); *G06F 2203/04109* (2013.01)
(58) Field of Classification Search
  USPC ........................................................ 345/175
  See application file for complete search history.

(56) References Cited

U.S. PATENT DOCUMENTS

| | | |
|---|---|---|
| 3,673,327 A | 6/1972 | Johnson et al. |
| 4,129,384 A | 12/1978 | Walker et al. |
| 4,180,702 A | 12/1979 | Sick et al. |
| 4,209,255 A | 6/1980 | Heynau et al. |
| 4,213,707 A | 7/1980 | Evans, Jr. |
| 4,254,333 A | 3/1981 | Bergstrom |
| 4,254,407 A | 3/1981 | Tipon |
| 4,294,543 A | 10/1981 | Apple et al. |
| 4,346,376 A | 8/1982 | Mallos |
| 4,420,261 A | 12/1983 | Barlow et al. |
| 4,484,179 A | 11/1984 | Kasday |
| 4,507,557 A | 3/1985 | Tsikos |
| 4,521,112 A | 6/1985 | Kuwabara et al. |
| 4,542,375 A | 9/1985 | Alles et al. |
| 4,550,250 A | 10/1985 | Mueller et al. |
| 4,593,191 A | 6/1986 | Alles |
| 4,673,918 A | 6/1987 | Adler et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,736,191 A | 4/1988 | Matzke et al. |
| 4,737,626 A | 4/1988 | Hasegawa |
| 4,746,770 A | 5/1988 | McAvinney |
| 4,752,655 A | 6/1988 | Tajiri et al. |
| 4,772,763 A | 9/1988 | Garwin et al. |
| 4,782,328 A | 11/1988 | Denlinger |
| 4,812,833 A | 3/1989 | Shimauchi |
| 4,837,430 A | 6/1989 | Hasegawa |
| 4,868,912 A | 9/1989 | Doering |
| 4,891,829 A | 1/1990 | Deckman et al. |
| 4,933,544 A | 6/1990 | Tamaru |
| 4,949,079 A | 8/1990 | Loebner |
| 4,986,662 A | 1/1991 | Bures |
| 4,988,983 A | 1/1991 | Wehrer |
| 5,065,185 A | 11/1991 | Powers et al. |
| 5,073,770 A | 12/1991 | Lowbner |
| 5,105,186 A | 4/1992 | May |
| 5,159,322 A | 10/1992 | Loebner |
| 5,166,668 A | 11/1992 | Aoyagi |
| 5,227,622 A | 7/1993 | Suzuki |
| 5,248,856 A | 9/1993 | Mallicoat |
| 5,254,407 A | 10/1993 | Sergerie et al. |
| 5,345,490 A | 9/1994 | Finnigan et al. |
| 5,383,022 A | 1/1995 | Kaser |
| 5,483,261 A | 1/1996 | Yasutake |
| 5,484,966 A | 1/1996 | Segen |
| 5,499,098 A | 3/1996 | Ogawa |
| 5,502,568 A | 3/1996 | Ogawa et al. |
| 5,525,764 A | 6/1996 | Junkins et al. |
| 5,570,181 A | 10/1996 | Yasuo et al. |
| 5,572,251 A | 11/1996 | Ogawa |
| 5,577,501 A | 11/1996 | Flohr et al. |
| 5,600,105 A | 2/1997 | Fukuzaki et al. |
| 5,672,852 A | 9/1997 | Fukuzaki et al. |
| 5,679,930 A | 10/1997 | Katsurahira |
| 5,686,942 A | 11/1997 | Ball |
| 5,688,933 A | 11/1997 | Evans et al. |
| 5,729,249 A | 3/1998 | Yasutake |
| 5,736,686 A | 4/1998 | Perret, Jr. et al. |
| 5,740,224 A | 4/1998 | Müller et al. |
| 5,764,223 A | 6/1998 | Chang et al. |
| 5,767,517 A | 6/1998 | Hawkins |
| 5,775,792 A | 7/1998 | Wiese |
| 5,945,980 A | 8/1999 | Moissev et al. |
| 5,945,981 A | 8/1999 | Paull et al. |
| 5,959,617 A | 9/1999 | Bird et al. |
| 6,061,177 A | 5/2000 | Fujimoto |
| 6,067,079 A | 5/2000 | Shieh |
| 6,122,394 A | 9/2000 | Neukermans et al. |
| 6,141,104 A | 10/2000 | Schulz et al. |
| 6,172,667 B1 | 1/2001 | Sayag |
| 6,227,667 B1 | 5/2001 | Halldorsson et al. |
| 6,229,529 B1 | 5/2001 | Yano et al. |
| 6,333,735 B1 | 12/2001 | Anvekar |
| 6,366,276 B1 | 4/2002 | Kunimatsu et al. |
| 6,380,732 B1 | 4/2002 | Gilboa |
| 6,380,740 B1 | 4/2002 | Laub |
| 6,390,370 B1 | 5/2002 | Plesko |
| 6,429,857 B1 | 8/2002 | Masters et al. |
| 6,452,996 B1 | 9/2002 | Hsieh |
| 6,476,797 B1 | 11/2002 | Kurihara et al. |
| 6,492,633 B2 | 12/2002 | Nakazawa et al. |
| 6,495,832 B1 | 12/2002 | Kirby |
| 6,504,143 B2 | 1/2003 | Koops et al. |
| 6,529,327 B1 | 3/2003 | Graindorge |
| 6,538,644 B1 | 3/2003 | Muraoka |
| 6,587,099 B2 | 7/2003 | Takekawa |
| 6,648,485 B1 | 11/2003 | Colgan et al. |
| 6,660,964 B1 | 12/2003 | Benderly |
| 6,664,498 B2 | 12/2003 | Forsman et al. |
| 6,664,952 B2 | 12/2003 | Iwamoto et al. |
| 6,690,363 B2 | 2/2004 | Newton |
| 6,707,027 B2 | 3/2004 | Liess et al. |
| 6,738,051 B2 | 5/2004 | Boyd et al. |
| 6,748,098 B1 | 6/2004 | Rosenfeld |
| 6,784,948 B2 | 8/2004 | Kawashima et al. |
| 6,799,141 B1 | 9/2004 | Stoustrup et al. |
| 6,806,871 B1 | 10/2004 | Yasue |
| 6,927,384 B2 | 8/2005 | Reime et al. |
| 6,940,286 B2 | 9/2005 | Wang et al. |
| 6,965,836 B2 | 11/2005 | Richardson |
| 6,972,753 B1 | 12/2005 | Kimura et al. |
| 6,985,137 B2 | 1/2006 | Kaikuranta |
| 7,042,444 B2 | 5/2006 | Cok |
| 7,084,859 B1 | 8/2006 | Pryor |
| 7,133,031 B2 | 11/2006 | Wang et al. |
| 7,176,904 B2 | 2/2007 | Satoh |
| 7,359,041 B2 | 4/2008 | Xie et al. |
| 7,397,418 B1 | 7/2008 | Doerry et al. |
| 7,432,893 B2 | 10/2008 | Ma et al. |
| 7,435,940 B2 | 10/2008 | Eliasson et al. |
| 7,442,914 B2 | 10/2008 | Eliasson et al. |
| 7,465,914 B2 | 12/2008 | Eliasson et al. |
| 7,613,375 B2 | 11/2009 | Shimizu |
| 7,629,968 B2 | 12/2009 | Miller et al. |
| 7,646,833 B1 | 1/2010 | He et al. |
| 7,653,883 B2 | 1/2010 | Hotelling et al. |
| 7,655,901 B2 | 2/2010 | Idzik et al. |
| 7,705,835 B2 | 4/2010 | Eikman |
| 7,847,789 B2 | 12/2010 | Kolmykov-Zotov et al. |
| 7,855,716 B2 | 12/2010 | McCreary et al. |
| 7,859,519 B2 | 12/2010 | Tulbert |
| 7,924,272 B2 | 4/2011 | Boer et al. |
| 7,932,899 B2 | 4/2011 | Newton et al. |
| 7,969,410 B2 | 6/2011 | Kakarala |
| 7,995,039 B2 | 8/2011 | Eliasson et al. |
| 8,013,845 B2 | 9/2011 | Ostergaard et al. |
| 8,031,186 B2 | 10/2011 | Ostergaard |
| 8,077,147 B2 | 12/2011 | Krah et al. |
| 8,093,545 B2 | 1/2012 | Leong et al. |
| 8,094,136 B2 | 1/2012 | Eliasson et al. |

(56) References Cited

U.S. PATENT DOCUMENTS

| | | |
|---|---|---|
| 8,094,910 B2 | 1/2012 | Xu |
| 8,149,211 B2 | 4/2012 | Hayakawa et al. |
| 8,218,154 B2 | 7/2012 | Østergaard et al. |
| 8,274,495 B2 | 9/2012 | Lee |
| 8,325,158 B2 | 12/2012 | Yatsuda et al. |
| 8,339,379 B2 | 12/2012 | Goertz et al. |
| 8,350,827 B2 | 1/2013 | Chung et al. |
| 8,384,010 B2 | 2/2013 | Hong et al. |
| 8,407,606 B1 | 3/2013 | Davidson et al. |
| 8,441,467 B2 | 5/2013 | Han |
| 8,445,834 B2 | 5/2013 | Hong et al. |
| 8,466,901 B2 | 6/2013 | Yen et al. |
| 8,482,547 B2 | 7/2013 | Cobon et al. |
| 8,542,217 B2 | 9/2013 | Wassvik et al. |
| 8,581,884 B2 | 11/2013 | Fåhraeus et al. |
| 8,624,858 B2 | 1/2014 | Fyke et al. |
| 8,686,974 B2 | 4/2014 | Christiansson et al. |
| 8,692,807 B2 | 4/2014 | Føhraeus et al. |
| 8,716,614 B2 | 5/2014 | Wassvik |
| 8,727,581 B2 | 5/2014 | Saccomanno |
| 8,745,514 B1 | 6/2014 | Davidson |
| 8,780,066 B2 | 7/2014 | Christiansson et al. |
| 8,830,181 B1 | 9/2014 | Clark et al. |
| 8,860,696 B2 | 10/2014 | Wassvik et al. |
| 8,872,098 B2 | 10/2014 | Bergström et al. |
| 8,872,801 B2 | 10/2014 | Bergström et al. |
| 8,884,900 B2 | 11/2014 | Wassvik |
| 8,890,843 B2 | 11/2014 | Wassvik et al. |
| 8,890,849 B2 | 11/2014 | Christiansson et al. |
| 8,928,590 B1 | 1/2015 | El Dokor |
| 8,963,886 B2 | 2/2015 | Wassvik |
| 8,982,084 B2 | 3/2015 | Christiansson et al. |
| 9,024,916 B2 | 5/2015 | Christiansson |
| 9,035,909 B2 | 5/2015 | Christiansson |
| 9,063,617 B2 | 6/2015 | Eliasson et al. |
| 9,086,763 B2 | 7/2015 | Johansson et al. |
| 9,134,854 B2 | 9/2015 | Wassvik et al. |
| 9,158,401 B2 | 10/2015 | Christiansson |
| 9,158,415 B2 | 10/2015 | Song et al. |
| 9,213,445 B2 | 12/2015 | King et al. |
| 9,274,645 B2 | 3/2016 | Christiansson et al. |
| 9,317,168 B2 | 4/2016 | Christiansson et al. |
| 9,323,396 B2 | 4/2016 | Han et al. |
| 9,366,565 B2 | 6/2016 | Uvnäs |
| 9,377,884 B2 | 6/2016 | Christiansson et al. |
| 9,389,732 B2 | 7/2016 | Craven-Bartle |
| 9,411,444 B2 | 8/2016 | Christiansson et al. |
| 9,411,464 B2 | 8/2016 | Wallander et al. |
| 9,430,079 B2 | 8/2016 | Christiansson et al. |
| 9,442,574 B2 | 9/2016 | Fåhraeus et al. |
| 9,547,393 B2 | 1/2017 | Christiansson et al. |
| 9,552,103 B2 | 1/2017 | Craven-Bartle et al. |
| 9,557,846 B2 | 1/2017 | Baharav et al. |
| 9,588,619 B2 | 3/2017 | Christiansson et al. |
| 9,594,467 B2 | 3/2017 | Christiansson et al. |
| 9,626,018 B2 | 4/2017 | Christiansson et al. |
| 9,626,040 B2 | 4/2017 | Wallander et al. |
| 9,639,210 B2 | 5/2017 | Wallander et al. |
| 9,678,602 B2 | 6/2017 | Wallander |
| 9,684,414 B2 | 6/2017 | Christiansson et al. |
| 9,710,101 B2 | 7/2017 | Christiansson et al. |
| 2001/0002694 A1 | 6/2001 | Nakazawa et al. |
| 2001/0005004 A1 | 6/2001 | Shiratsuki et al. |
| 2001/0005308 A1 | 6/2001 | Oishi et al. |
| 2001/0030642 A1 | 10/2001 | Sullivan et al. |
| 2002/0067348 A1 | 6/2002 | Masters et al. |
| 2002/0075243 A1 | 6/2002 | Newton |
| 2002/0118177 A1 | 8/2002 | Newton |
| 2002/0158823 A1 | 10/2002 | Zavracky et al. |
| 2002/0158853 A1 | 10/2002 | Sugawara et al. |
| 2002/0163505 A1 | 11/2002 | Takekawa |
| 2003/0016450 A1 | 1/2003 | Bluemel et al. |
| 2003/0034439 A1 | 2/2003 | Reime et al. |
| 2003/0034935 A1 | 2/2003 | Amanai et al. |
| 2003/0048257 A1 | 3/2003 | Mattila |
| 2003/0052257 A1 | 3/2003 | Sumriddetchkajorn |
| 2003/0095399 A1 | 5/2003 | Grenda et al. |
| 2003/0107748 A1 | 6/2003 | Lee |
| 2003/0137494 A1 | 7/2003 | Tulbert |
| 2003/0156100 A1 | 8/2003 | Gettemy |
| 2003/0160155 A1 | 8/2003 | Liess |
| 2003/0210537 A1 | 11/2003 | Engelmann |
| 2003/0214486 A1 | 11/2003 | Roberts |
| 2004/0027339 A1 | 2/2004 | Schulz |
| 2004/0032401 A1 | 2/2004 | Nakazawa et al. |
| 2004/0090432 A1 | 5/2004 | Takahashi et al. |
| 2004/0130338 A1 | 7/2004 | Wang et al. |
| 2004/0174541 A1 | 9/2004 | Freifeld |
| 2004/0201579 A1 | 10/2004 | Graham |
| 2004/0212603 A1 | 10/2004 | Cok |
| 2004/0238627 A1 | 12/2004 | Silverbrook et al. |
| 2004/0239702 A1 | 12/2004 | Kang et al. |
| 2004/0245438 A1 | 12/2004 | Payne et al. |
| 2004/0252091 A1 | 12/2004 | Ma et al. |
| 2004/0252867 A1 | 12/2004 | Lan et al. |
| 2005/0012714 A1 | 1/2005 | Russo et al. |
| 2005/0041013 A1 | 2/2005 | Tanaka |
| 2005/0057903 A1 | 3/2005 | Choi |
| 2005/0073508 A1 | 4/2005 | Pittel et al. |
| 2005/0083293 A1 | 4/2005 | Dixon |
| 2005/0128190 A1 | 6/2005 | Ryynanen |
| 2005/0143923 A1 | 6/2005 | Keers et al. |
| 2005/0156914 A1 | 7/2005 | Lipman et al. |
| 2005/0162398 A1 | 7/2005 | Eliasson et al. |
| 2005/0179977 A1 | 8/2005 | Chui et al. |
| 2005/0200613 A1 | 9/2005 | Kobayashi et al. |
| 2005/0212774 A1 | 9/2005 | Ho et al. |
| 2005/0248540 A1 | 11/2005 | Newton |
| 2005/0253834 A1 | 11/2005 | Sakamaki et al. |
| 2005/0276053 A1 | 12/2005 | Nortrup et al. |
| 2006/0001650 A1 | 1/2006 | Robbins et al. |
| 2006/0001653 A1 | 1/2006 | Smits |
| 2006/0007185 A1 | 1/2006 | Kobayashi |
| 2006/0008164 A1 | 1/2006 | Wu et al. |
| 2006/0017706 A1 | 1/2006 | Cutherell et al. |
| 2006/0017709 A1 | 1/2006 | Okano |
| 2006/0033725 A1 | 2/2006 | Marggraff et al. |
| 2006/0038698 A1 | 2/2006 | Chen |
| 2006/0114237 A1 | 6/2006 | Crockett et al. |
| 2006/0139340 A1 | 6/2006 | Geaghan |
| 2006/0158437 A1 | 7/2006 | Blythe et al. |
| 2006/0170658 A1 | 8/2006 | Nakamura et al. |
| 2006/0202974 A1 | 9/2006 | Thielman |
| 2006/0227120 A1 | 10/2006 | Eikman |
| 2006/0255248 A1 | 11/2006 | Eliasson |
| 2006/0256092 A1 | 11/2006 | Lee |
| 2006/0279558 A1 | 12/2006 | Van Delden et al. |
| 2006/0281543 A1 | 12/2006 | Sutton et al. |
| 2006/0290684 A1 | 12/2006 | Giraldo et al. |
| 2007/0014486 A1 | 1/2007 | Schiwietz et al. |
| 2007/0024598 A1 | 2/2007 | Miller et al. |
| 2007/0034783 A1 | 2/2007 | Eliasson et al. |
| 2007/0038691 A1 | 2/2007 | Candes et al. |
| 2007/0052684 A1 | 3/2007 | Gruhlke et al. |
| 2007/0070056 A1 | 3/2007 | Sato et al. |
| 2007/0075648 A1 | 4/2007 | Blythe et al. |
| 2007/0120833 A1 | 5/2007 | Yamaguchi et al. |
| 2007/0125937 A1 | 6/2007 | Eliasson et al. |
| 2007/0152985 A1 | 7/2007 | Ostergaard et al. |
| 2007/0201042 A1 | 8/2007 | Eliasson et al. |
| 2007/0296688 A1 | 12/2007 | Nakamura et al. |
| 2008/0006766 A1 | 1/2008 | Oon et al. |
| 2008/0007540 A1 | 1/2008 | Ostergaard |
| 2008/0007541 A1 | 1/2008 | Eliasson et al. |
| 2008/0007542 A1 | 1/2008 | Eliasson et al. |
| 2008/0011944 A1 | 1/2008 | Chua et al. |
| 2008/0029691 A1 | 2/2008 | Han |
| 2008/0036743 A1 | 2/2008 | Westerman et al. |
| 2008/0062150 A1 | 3/2008 | Lee |
| 2008/0068691 A1 | 3/2008 | Miyatake |
| 2008/0074401 A1 | 3/2008 | Chung et al. |
| 2008/0088603 A1 | 4/2008 | Eliasson et al. |
| 2008/0121442 A1 | 5/2008 | Boer et al. |
| 2008/0122792 A1 | 5/2008 | Izadi et al. |

(56) References Cited

U.S. PATENT DOCUMENTS

| | | |
|---|---|---|
| 2008/0122803 A1 | 5/2008 | Izadi et al. |
| 2008/0130979 A1 | 6/2008 | Run et al. |
| 2008/0151126 A1 | 6/2008 | Yu |
| 2008/0158176 A1 | 7/2008 | Land et al. |
| 2008/0189046 A1 | 8/2008 | Eliasson et al. |
| 2008/0192025 A1 | 8/2008 | Jaeger et al. |
| 2008/0238433 A1 | 10/2008 | Joutsenoja et al. |
| 2008/0252619 A1 | 10/2008 | Crockett et al. |
| 2008/0266266 A1 | 10/2008 | Kent et al. |
| 2008/0278460 A1 | 11/2008 | Arnett et al. |
| 2008/0284925 A1 | 11/2008 | Han |
| 2008/0291668 A1 | 11/2008 | Aylward et al. |
| 2008/0297482 A1 | 12/2008 | Weiss |
| 2009/0002340 A1 | 1/2009 | Van Genechten |
| 2009/0006292 A1 | 1/2009 | Block |
| 2009/0040786 A1 | 2/2009 | Mori |
| 2009/0066647 A1 | 3/2009 | Kerr et al. |
| 2009/0067178 A1 | 3/2009 | Huang et al. |
| 2009/0073142 A1 | 3/2009 | Yamashita et al. |
| 2009/0077501 A1 | 3/2009 | Partridge et al. |
| 2009/0085894 A1 | 4/2009 | Gandhi et al. |
| 2009/0091554 A1 | 4/2009 | Keam |
| 2009/0115919 A1 | 5/2009 | Tanaka et al. |
| 2009/0122020 A1 | 5/2009 | Eliasson et al. |
| 2009/0128508 A1 | 5/2009 | Sohn et al. |
| 2009/0135162 A1 | 5/2009 | Van De Wijdeven et al. |
| 2009/0143141 A1 | 6/2009 | Wells et al. |
| 2009/0153519 A1 | 6/2009 | Suarez Rovere |
| 2009/0161026 A1 | 6/2009 | Wu et al. |
| 2009/0168459 A1 | 7/2009 | Holman et al. |
| 2009/0187842 A1 | 7/2009 | Collins et al. |
| 2009/0189857 A1 | 7/2009 | Benko et al. |
| 2009/0189874 A1 | 7/2009 | Chene et al. |
| 2009/0189878 A1* | 7/2009 | Goertz .................. G06F 3/0421 345/175 |
| 2009/0219256 A1 | 9/2009 | Newton |
| 2009/0229892 A1* | 9/2009 | Fisher .................. G06F 1/1626 178/18.03 |
| 2009/0251439 A1 | 10/2009 | Westerman et al. |
| 2009/0256817 A1 | 10/2009 | Perlin et al. |
| 2009/0259967 A1 | 10/2009 | Davidson et al. |
| 2009/0267919 A1 | 10/2009 | Chao et al. |
| 2009/0273794 A1 | 11/2009 | Østergaard et al. |
| 2009/0278816 A1 | 11/2009 | Colson |
| 2009/0297009 A1 | 12/2009 | Xu et al. |
| 2010/0045629 A1 | 2/2010 | Newton |
| 2010/0060896 A1 | 3/2010 | Van De Wijdeven et al. |
| 2010/0066016 A1 | 3/2010 | Van De Wijdeven et al. |
| 2010/0066704 A1 | 3/2010 | Kasai |
| 2010/0073318 A1 | 3/2010 | Hu et al. |
| 2010/0078545 A1 | 4/2010 | Leong et al. |
| 2010/0079407 A1 | 4/2010 | Suggs et al. |
| 2010/0079408 A1 | 4/2010 | Leong et al. |
| 2010/0097345 A1 | 4/2010 | Jang et al. |
| 2010/0097348 A1 | 4/2010 | Park et al. |
| 2010/0097353 A1 | 4/2010 | Newton |
| 2010/0125438 A1 | 5/2010 | Audet |
| 2010/0127975 A1 | 5/2010 | Jensen |
| 2010/0134435 A1 | 6/2010 | Kimura et al. |
| 2010/0142823 A1 | 6/2010 | Wang et al. |
| 2010/0187422 A1 | 7/2010 | Kothari et al. |
| 2010/0193259 A1 | 8/2010 | Wassvik |
| 2010/0229091 A1 | 9/2010 | Homma et al. |
| 2010/0238139 A1* | 9/2010 | Goertz .................. G06F 3/042 345/175 |
| 2010/0245292 A1 | 9/2010 | Wu |
| 2010/0265170 A1 | 10/2010 | Norieda |
| 2010/0277436 A1 | 11/2010 | Feng et al. |
| 2010/0283785 A1 | 11/2010 | Satulovsky |
| 2010/0284596 A1 | 11/2010 | Miao et al. |
| 2010/0289754 A1 | 11/2010 | Sleeman et al. |
| 2010/0295821 A1 | 11/2010 | Chang et al. |
| 2010/0302196 A1 | 12/2010 | Han et al. |
| 2010/0302209 A1 | 12/2010 | Large |
| 2010/0302210 A1 | 12/2010 | Han et al. |
| 2010/0302240 A1 | 12/2010 | Lettvin |
| 2010/0315379 A1 | 12/2010 | Allard et al. |
| 2010/0321328 A1 | 12/2010 | Chang et al. |
| 2010/0322550 A1 | 12/2010 | Trott |
| 2011/0043490 A1 | 2/2011 | Powell et al. |
| 2011/0050649 A1 | 3/2011 | Newton et al. |
| 2011/0051394 A1 | 3/2011 | Bailey |
| 2011/0068256 A1 | 3/2011 | Hong et al. |
| 2011/0069039 A1 | 3/2011 | Lee et al. |
| 2011/0069807 A1 | 3/2011 | Dennerlein et al. |
| 2011/0074734 A1 | 3/2011 | Wassvik et al. |
| 2011/0074735 A1 | 3/2011 | Wassvik et al. |
| 2011/0090176 A1 | 4/2011 | Christiansson et al. |
| 2011/0102374 A1 | 5/2011 | Wassvik et al. |
| 2011/0115748 A1 | 5/2011 | Xu |
| 2011/0122091 A1 | 5/2011 | King et al. |
| 2011/0122094 A1 | 5/2011 | Tsang et al. |
| 2011/0134079 A1 | 6/2011 | Stark |
| 2011/0147569 A1 | 6/2011 | Drumm |
| 2011/0157095 A1 | 6/2011 | Drumm |
| 2011/0157096 A1 | 6/2011 | Drumm |
| 2011/0163996 A1 | 7/2011 | Wassvik et al. |
| 2011/0163997 A1 | 7/2011 | Kim |
| 2011/0163998 A1 | 7/2011 | Goertz et al. |
| 2011/0169780 A1 | 7/2011 | Goertz et al. |
| 2011/0175852 A1* | 7/2011 | Goertz .................. G06F 3/042 345/175 |
| 2011/0205186 A1 | 8/2011 | Newton et al. |
| 2011/0216042 A1 | 9/2011 | Wassvik et al. |
| 2011/0221997 A1 | 9/2011 | Kim et al. |
| 2011/0227036 A1 | 9/2011 | Vaufrey |
| 2011/0227874 A1 | 9/2011 | Fåhraeus et al. |
| 2011/0234537 A1 | 9/2011 | Kim et al. |
| 2011/0261020 A1 | 10/2011 | Song et al. |
| 2011/0267296 A1 | 11/2011 | Noguchi et al. |
| 2011/0291989 A1 | 12/2011 | Lee |
| 2011/0298743 A1* | 12/2011 | Machida ............... G06F 3/0488 345/173 |
| 2011/0310045 A1 | 12/2011 | Toda et al. |
| 2012/0019448 A1 | 1/2012 | Pitkanen et al. |
| 2012/0026408 A1 | 2/2012 | Lee et al. |
| 2012/0038593 A1 | 2/2012 | Rönkä et al. |
| 2012/0062474 A1 | 3/2012 | Weishaupt et al. |
| 2012/0068973 A1 | 3/2012 | Christiansson et al. |
| 2012/0086673 A1 | 4/2012 | Chien et al. |
| 2012/0089348 A1 | 4/2012 | Perlin et al. |
| 2012/0110447 A1 | 5/2012 | Chen |
| 2012/0131490 A1 | 5/2012 | Lin et al. |
| 2012/0146930 A1 | 6/2012 | Lee |
| 2012/0153134 A1* | 6/2012 | Bergstrom et al. ..... G06F 3/042 250/221 |
| 2012/0154338 A1 | 6/2012 | Bergström et al. |
| 2012/0162142 A1 | 6/2012 | Christiansson et al. |
| 2012/0162144 A1 | 6/2012 | Fåhraeus et al. |
| 2012/0169672 A1* | 7/2012 | Christiansson ....... G06F 3/0421 345/175 |
| 2012/0181419 A1 | 7/2012 | Momtahan |
| 2012/0182266 A1 | 7/2012 | Han |
| 2012/0188206 A1 | 7/2012 | Sparf et al. |
| 2012/0191993 A1 | 7/2012 | Drader et al. |
| 2012/0200532 A1 | 8/2012 | Powell et al. |
| 2012/0200538 A1 | 8/2012 | Christiansson et al. |
| 2012/0212441 A1 | 8/2012 | Christiansson et al. |
| 2012/0217882 A1 | 8/2012 | Wong et al. |
| 2012/0249478 A1 | 10/2012 | Chang et al. |
| 2012/0256882 A1 | 10/2012 | Christiansson et al. |
| 2012/0268403 A1 | 10/2012 | Christiansson |
| 2012/0268427 A1 | 10/2012 | Slobodin |
| 2012/0274559 A1 | 11/2012 | Mathai et al. |
| 2012/0305755 A1 | 12/2012 | Hong et al. |
| 2013/0021300 A1 | 1/2013 | Wassvik |
| 2013/0021302 A1 | 1/2013 | Drumm |
| 2013/0027404 A1 | 1/2013 | Sarnoff |
| 2013/0044073 A1 | 2/2013 | Christiansson et al. |
| 2013/0076697 A1 | 3/2013 | Goertz et al. |
| 2013/0082980 A1 | 4/2013 | Gruhlke et al. |
| 2013/0107569 A1 | 5/2013 | Suganuma |
| 2013/0113715 A1 | 5/2013 | Grant et al. |
| 2013/0120320 A1 | 5/2013 | Liu et al. |

(56) References Cited

U.S. PATENT DOCUMENTS

| | | |
|---|---|---|
| 2013/0125016 A1 | 5/2013 | Pallakoff et al. |
| 2013/0127790 A1 | 5/2013 | Wassvik |
| 2013/0135258 A1 | 5/2013 | King et al. |
| 2013/0135259 A1 | 5/2013 | King et al. |
| 2013/0141388 A1 | 6/2013 | Ludwig et al. |
| 2013/0154983 A1 | 6/2013 | Christiansson et al. |
| 2013/0181896 A1 | 7/2013 | Gruhlke et al. |
| 2013/0187891 A1 | 7/2013 | Eriksson et al. |
| 2013/0201142 A1 | 8/2013 | Suarez Rovere |
| 2013/0222346 A1 | 8/2013 | Chen et al. |
| 2013/0249833 A1 | 9/2013 | Christiansson et al. |
| 2013/0269867 A1 | 10/2013 | Trott |
| 2013/0275082 A1 | 10/2013 | Follmer et al. |
| 2013/0285920 A1 | 10/2013 | Colley |
| 2013/0285968 A1 | 10/2013 | Christiansson et al. |
| 2013/0300716 A1 | 11/2013 | Craven-Bartle et al. |
| 2013/0307795 A1 | 11/2013 | Suarez Rovere |
| 2013/0342490 A1 | 12/2013 | Wallander et al. |
| 2014/0002400 A1 | 1/2014 | Christiansson et al. |
| 2014/0028575 A1 | 1/2014 | Parivar et al. |
| 2014/0028604 A1 | 1/2014 | Morinaga et al. |
| 2014/0028629 A1 | 1/2014 | Drumm et al. |
| 2014/0036203 A1 | 2/2014 | Guillou et al. |
| 2014/0055421 A1 | 2/2014 | Christiansson et al. |
| 2014/0063853 A1 | 3/2014 | Nichol et al. |
| 2014/0071653 A1 | 3/2014 | Thompson et al. |
| 2014/0085241 A1 | 3/2014 | Christiansson et al. |
| 2014/0092052 A1 | 4/2014 | Grunthaner et al. |
| 2014/0098058 A1 | 4/2014 | Baharav et al. |
| 2014/0109219 A1 | 4/2014 | Rohrweck et al. |
| 2014/0125633 A1 | 5/2014 | Fåhraeus et al. |
| 2014/0160762 A1 | 6/2014 | Dudik et al. |
| 2014/0232669 A1 | 8/2014 | Ohlsson et al. |
| 2014/0237401 A1 | 8/2014 | Krus et al. |
| 2014/0237408 A1 | 8/2014 | Ohlsson et al. |
| 2014/0237422 A1 | 8/2014 | Ohlsson et al. |
| 2014/0253831 A1 | 9/2014 | Craven-Bartle |
| 2014/0267124 A1 | 9/2014 | Christiansson et al. |
| 2014/0292701 A1 | 10/2014 | Christiansson et al. |
| 2014/0300572 A1 | 10/2014 | Ohlsson et al. |
| 2014/0320460 A1 | 10/2014 | Johansson et al. |
| 2014/0347325 A1 | 11/2014 | Wallander et al. |
| 2014/0368471 A1 | 12/2014 | Christiansson et al. |
| 2014/0375607 A1 | 12/2014 | Christiansson et al. |
| 2015/0035774 A1 | 2/2015 | Christiansson et al. |
| 2015/0035803 A1 | 2/2015 | Wassvik et al. |
| 2015/0053850 A1 | 2/2015 | Uvnäs |
| 2015/0054759 A1 | 2/2015 | Christiansson et al. |
| 2015/0083891 A1 | 3/2015 | Wallander |
| 2015/0103013 A9 | 4/2015 | Huang |
| 2015/0130769 A1 | 5/2015 | Björklund |
| 2015/0138105 A1 | 5/2015 | Christiansson et al. |
| 2015/0138158 A1 | 5/2015 | Wallander et al. |
| 2015/0138161 A1 | 5/2015 | Wassvik |
| 2015/0205441 A1 | 7/2015 | Bergström et al. |
| 2015/0215450 A1 | 7/2015 | Seo et al. |
| 2015/0242055 A1 | 8/2015 | Wallander |
| 2015/0317036 A1 | 11/2015 | Johansson et al. |
| 2015/0324028 A1 | 11/2015 | Wassvik et al. |
| 2015/0331544 A1 | 11/2015 | Bergström et al. |
| 2015/0331545 A1 | 11/2015 | Wassvik et al. |
| 2015/0331546 A1 | 11/2015 | Craven-Bartle et al. |
| 2015/0331547 A1 | 11/2015 | Wassvik et al. |
| 2015/0332655 A1 | 11/2015 | Krus et al. |
| 2015/0346856 A1 | 12/2015 | Wassvik |
| 2015/0346911 A1 | 12/2015 | Christiansson |
| 2015/0363042 A1 | 12/2015 | Krus et al. |
| 2016/0026337 A1 | 1/2016 | Wassvik et al. |
| 2016/0034099 A1 | 2/2016 | Christiansson et al. |
| 2016/0050746 A1 | 2/2016 | Wassvik et al. |
| 2016/0070415 A1 | 3/2016 | Christiansson et al. |
| 2016/0070416 A1 | 3/2016 | Wassvik |
| 2016/0124546 A1 | 5/2016 | Chen et al. |
| 2016/0124551 A1 | 5/2016 | Christiansson et al. |
| 2016/0154531 A1 | 6/2016 | Wall |
| 2016/0202841 A1 | 7/2016 | Christiansson et al. |
| 2016/0216844 A1 | 7/2016 | Bergström |
| 2016/0224144 A1 | 8/2016 | Klinghult et al. |
| 2016/0299593 A1 | 10/2016 | Christiansson et al. |
| 2016/0328090 A1 | 11/2016 | Klinghult |
| 2016/0328091 A1 | 11/2016 | Wassvik et al. |
| 2016/0334942 A1 | 11/2016 | Wassvik |
| 2016/0342282 A1 | 11/2016 | Wassvik |
| 2016/0357348 A1 | 12/2016 | Wallander |
| 2017/0010688 A1 | 1/2017 | Fahraeus et al. |
| 2017/0090090 A1 | 3/2017 | Craven-Bartle et al. |
| 2017/0102827 A1 | 4/2017 | Christiansson et al. |
| 2017/0115235 A1 | 4/2017 | Ohlsson et al. |
| 2017/0139541 A1 | 5/2017 | Christiansson et al. |
| 2017/0177163 A1 | 6/2017 | Wallander et al. |
| 2017/0185230 A1 | 6/2017 | Wallander et al. |

FOREIGN PATENT DOCUMENTS

| | | |
|---|---|---|
| CN | 201437963 U | 4/2010 |
| CN | 101019071 B | 6/2012 |
| CN | 101206550 B | 6/2012 |
| CN | 101075168 B | 4/2014 |
| DE | 3511330 C2 | 5/1988 |
| DE | 68902419 T2 | 3/1993 |
| DE | 69000920 T2 | 6/1993 |
| DE | 19809934 A1 | 9/1999 |
| DE | 10026201 A1 | 12/2000 |
| DE | 102010000473 A1 | 8/2010 |
| EP | 0600576 B1 | 10/1998 |
| EP | 1798630 A2 | 6/2007 |
| EP | 0897161 B1 | 10/2007 |
| EP | 2088501 A1 | 8/2009 |
| EP | 1512989 B1 | 9/2009 |
| EP | 2077490 A3 | 1/2010 |
| EP | 1126236 B1 | 12/2010 |
| EP | 2314203 A1 | 4/2011 |
| EP | 2339437 A3 | 10/2011 |
| EP | 2479642 A1 | 7/2012 |
| EP | 1457870 B1 | 8/2012 |
| FR | 2172828 A1 | 10/1973 |
| FR | 2617619 B1 | 1/1990 |
| FR | 2614711 B1 | 3/1992 |
| FR | 2617620 B1 | 9/1992 |
| FR | 2676275 A1 | 11/1992 |
| GB | 1380144 A | 1/1975 |
| GB | 2131544 B | 3/1986 |
| GB | 2204126 A | 11/1988 |
| JP | 2000506655 A | 5/2000 |
| JP | 2000172438 A | 6/2000 |
| JP | 2000259334 A | 9/2000 |
| JP | 2000293311 A | 10/2000 |
| JP | 2003330603 A | 11/2003 |
| JP | 2005004278 A | 1/2005 |
| JP | 2008506173 A | 2/2008 |
| JP | 2011530124 A | 12/2011 |
| KR | 100359400 | 7/2001 |
| KR | 100940435 | 2/2010 |
| WO | WO 1984/003186 A1 | 8/1984 |
| WO | WO 1999/046602 A1 | 9/1999 |
| WO | WO 01/84251 A2 | 11/2001 |
| WO | WO 02/35460 A1 | 5/2002 |
| WO | WO 02/077915 A2 | 10/2002 |
| WO | WO 02/095668 A1 | 11/2002 |
| WO | WO 03/076870 A1 | 9/2003 |
| WO | WO 2004/081502 A2 | 9/2004 |
| WO | WO 2004/081956 A2 | 9/2004 |
| WO | WO 2005/026938 A2 | 3/2005 |
| WO | WO 2005/029172 A2 | 3/2005 |
| WO | WO 2005/029395 A2 | 3/2005 |
| WO | WO 2005/125011 A1 | 12/2005 |
| WO | WO 2006/095320 A2 | 9/2006 |
| WO | WO 2006/124551 A2 | 11/2006 |
| WO | WO 2007/003196 A2 | 1/2007 |
| WO | WO 2007/058924 A2 | 5/2007 |
| WO | WO 2007/112742 A1 | 10/2007 |
| WO | WO 2008/004103 A2 | 1/2008 |
| WO | WO 2008/007276 A2 | 1/2008 |
| WO | WO 2008/017077 A2 | 2/2008 |

(56) References Cited

FOREIGN PATENT DOCUMENTS

| WO | WO 2008/039006 A1 | 4/2008 |
|---|---|---|
| WO | WO 2008/068607 A2 | 6/2008 |
| WO | WO 2006/124551 B1 | 7/2008 |
| WO | WO 2008/017077 A4 | 2/2009 |
| WO | 2009048365 A1 | 4/2009 |
| WO | WO 2009/077962 A2 | 6/2009 |
| WO | WO 2009/102681 A2 | 8/2009 |
| WO | WO 2009/137355 A2 | 11/2009 |
| WO | 2010006882 A2 | 1/2010 |
| WO | WO 2010/006883 A2 | 1/2010 |
| WO | WO 2010/006884 A2 | 1/2010 |
| WO | WO 2010/006885 A2 | 1/2010 |
| WO | WO 2010/006886 A2 | 1/2010 |
| WO | WO 2010/015408 A1 | 2/2010 |
| WO | WO 2010/046539 A1 | 4/2010 |
| WO | WO 2010/056177 A1 | 5/2010 |
| WO | 2010064983 A2 | 6/2010 |
| WO | WO 2010/081702 A2 | 7/2010 |
| WO | WO 2010/112404 A1 | 10/2010 |
| WO | 2010134865 A1 | 11/2010 |
| WO | 2011028169 A1 | 3/2011 |
| WO | 2011028170 A1 | 3/2011 |
| WO | 2011049512 A1 | 4/2011 |
| WO | WO 2011/049511 A1 | 4/2011 |
| WO | WO 2011/049513 A1 | 4/2011 |
| WO | WO 2011/057572 A1 | 5/2011 |
| WO | WO 2011/078769 A1 | 6/2011 |
| WO | WO 2011/082477 A1 | 7/2011 |
| WO | WO 2011/139213 A1 | 11/2011 |
| WO | WO 2012/002894 A1 | 1/2012 |
| WO | WO 2012/010078 A1 | 1/2012 |
| WO | WO 2012/050510 A1 | 4/2012 |
| WO | WO 2012/082055 A1 | 6/2012 |
| WO | WO 2012/105893 A1 | 8/2012 |
| WO | WO 2012/121652 A1 | 9/2012 |
| WO | WO 2012/158105 A2 | 11/2012 |
| WO | WO 2012/176801 A1 | 12/2012 |
| WO | WO 2013/048312 A2 | 4/2013 |
| WO | WO 2013/055282 A2 | 4/2013 |
| WO | WO 2013/062471 A2 | 5/2013 |
| WO | WO 2013/089622 A2 | 6/2013 |

OTHER PUBLICATIONS

Chou, N., et al., "Generalized pseudo-polar Fourier grids and applications in regfersting optical coherence tomography images," 43rd Asilomar Conference on Signals, Systems and Computers, Nov. 2009, in 5 pages.

Fihn, M., "Touch Panel—Special Edition," Veritas et Visus, Nov. 2011, in 1 page.

Fourmont, K., "Non-Equispaced Fast Fourier Transforms with Applications to Tomography," Journal of Fourier Analysis and Applications, vol. 9, Issue 5, 2003, in 20 pages.

Iizuka, K., "Boundaries, Near-Field Optics, and Near-Field Imaging," Elements of Photonics, vol. 1: In Free Space and Special Media, Wiley & Sons, 2002, in 57 pages.

Johnson, M., "Enhanced Optical Touch Input Panel", IBM Technical Disclousre Bulletin, 1985, in 3 pages.

Kak, et al., "Principles of Computerized Tomographic Imaging", Institute of Electrical Engineers, Inc., 1999, in 333 pages.

The Laser Wall, MIT, 1997, http://web.media.mit.edu/~joep/SpectrumWeb/captions/Laser.html.

Liu, J., et al. "Multiple touch points identifying method, involves starting touch screen, driving specific emission tube, and computing and transmitting coordinate of touch points to computer system by direct lines through interface of touch screen," 2007, in 25 pages.

Natterer, F., "The Mathematics of Computerized Tomography", Society for Industrial and Applied Mathematics, 2001, in 240 pages.

Natterer, F., et al. "Fourier Reconstruction," Mathematical Methods in Image Reconstruction, Society for Industrial and Applied Mathematics, 2001, in 12 pages.

Paradiso, J.A., "Several Sensor Approaches that Retrofit Large Surfaces for Interactivity," ACM Ubicomp 2002 Workshop on Collaboration with Interactive Walls and Tables, 2002, in 8 pages.

Tedaldi, M., et al. "Refractive index mapping of layered samples using optical coherence refractometry," Proceedings of SPIE, vol. 7171, 2009, in 8 pages.

\* cited by examiner

PARTIAL DETECT MODE

CROSS-REFERENCE TO RELATED APPLICATIONS

The present application claims the benefit of Swedish patent application No. 1350870-0, filed 12 Jul. 2013.

FIELD OF THE INVENTION

The present invention relates to low power functions in a touch system to e.g. start up the system according to the preamble of the independent claim. In particular, the touch system includes distributed control devices configured to control emission and detection of light.

BACKGROUND OF THE INVENTION

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art. To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

WO2011/028169 and WO2011/049512 disclose multi-touch systems that are based on frustrated total internal reflection (FTIR). Light sheets are coupled into a panel to propagate inside the panel by total internal reflection (TIR). When an object comes into contact with a touch surface of the panel, the propagating light is attenuated at the point of touch. The transmitted light is measured at a plurality of outcoupling points by one or more light sensors. The signals from the light sensors are processed for input into an image reconstruction algorithm that generates a 2D representation of interaction across the touch surface. This enables repeated determination of current position/size/shape of touches in the 2D representation while one or more users interact with the touch surface. Examples of such touch systems are found in U.S. Pat. No. 3,673,327, U.S. Pat. No. 4,254,333, U.S. Pat. No. 6,972,753, US2004/0252091, US2006/0114237, US2007/0075648, WO2009/048365, US2009/0153519, WO2010/006882, WO2010/064983, and WO2010/134865.

An overall goal for the touch system is to consume less energy to save resources and reduce costs. For example, when the system is not used it can be in a power saving mode or an idle mode in which modes the system is configured to use less power than in a normal mode. Such a system is disclosed in e.g. WO2011/028170 which uses a less number of emitters/detectors in power saving or idle mode than in a normal detect mode to save power. When an interaction on the touch surface is detected, the system is turned into normal mode.

The touch technology is now being implemented into consumer products such as smartphones and laptops. These products commonly have a limited access to power, e.g. battery, and new challenges are approached when integrating the touch system into the often smaller products. An ASIC (Application Specific Integrated Circuit) has been developed to which a limited number of emitters and detectors are connected. By using ASICs the touch system can be made smaller and use less energy. The whole touch system comprises a plurality of ASIC blocks with connected emitters and detectors.

The need for power saving solutions is however still present. The system needs to monitor when to change mode from a power saving or idle mode to a normal mode and this monitoring uses power. A common used approached is to have a button to activate the touch system. A mechanical part is thus sensitive to mechanical failure.

From US2012/0191993 a system and method is known for reducing power consumption in an electronic device such as a mobile phone having a touch-sensitive display. The system comprises a touch panel controller, which may have resource constraints compared to a main processor, for preliminary gesture recognition to transition the electronic device from sleep mode to full power mode. The touch panel controller consumes less power than the main processor and power can thus be saved.

It is an object of the present invention to provide a low power function which takes advantage of a distributed control structure of the touch system.

SUMMARY OF THE INVENTION

According to a first aspect, the object is at least partly achieved by a touch sensitive system according to the first independent claim. The system comprises a touch sensitive panel defining a touch surface, a plurality of emitters configured to emit light into the panel for propagation in the panel and a plurality of detectors configured to detect the light propagating in the panel. The system further comprises a plurality of distributed control devices each configured to control operation of a segment of emitters and detectors, and a main control unit configured to control the distributed control devices.

The touch sensitive system is configured to be set in a partial detect mode in which mode a first of the distributed control devices is configured to be active and to control a first emitter to emit light in a partial region of the panel coincident with a partial area of the touch surface. The touch sensitive system is further configured to detect a predetermined gesture on the partial area of the touch surface; generate a gesture signal indicating the predetermined gesture, and activate a feature of the touch sensitive system in accordance with the predetermined gesture.

As only a subset of the distributed control devices, e.g. one or two, are used in the partial detect mode, power consumption can be kept very low. As less power is used, one control device can be used for both emitting and detecting at the same time as fewer disturbances will be introduced into the control device during detection. In a normal operation, a distributed control device is used for only emitting or detection at the same time to not compromise any detection results, as currents necessary for emitting light otherwise might disturb the detection result.

According to one embodiment, the main control unit is configured to be set in a low power mode when the touch sensitive system is set in the partial detect mode. The main control unit is normally the most power demanding unit in the system. If the touch sensitive system is not used, it can save energy by setting itself in a partial detect mode in which mode the main control unit is set in a low power mode and only a subset of the distributed control devices are active. When the main control unit is in the low power mode, most or all of the functions of the main control unit are disabled and do not consume any energy.

According to one embodiment, each distributed control device comprises a processing unit and a computer readable storage medium. Thus, each distributed control device has the possibility to store operational instructions and to act independently from the main control unit.

According to one embodiment, the distributed control devices are grouped into at least one group. All the distributed control devices may be grouped into the same group, and then there is only one group. Instead, the distributed control devices may be divided into two or more groups. According to one embodiment, the distributed control devices in each group are connected in series. By having the distributed control devices connected in series, the need for separate cables between each distributed control device and the main control unit is obviated. Thus, space can be saved and less cable length is needed. Disturbances may be introduced by cables, and if they are made shorter then disturbances can be reduced. It follows that the control devices in a group communicate in a serial way. According to one embodiment, only one of the distributed control devices in each group is operatively connected directly to the main control unit. This control device will then act as a master over the other distributed control devices in the same group. Only one interface from the main control unit to each master is then needed. The interface may e.g. include one or several cables.

According to one embodiment, a second of the distributed control devices is configured to be active in the partial detect mode, wherein the first and the second distributed control devices are grouped into the same group. With this configuration it is possible to have e.g. a partial area in a corner of the touch surface and energy is saved compared to having all the distributed control devices active.

According to another embodiment, the first distributed control device is configured to detect a predetermined gesture and to generate a gesture signal. The first distributed control device may thus independently emit light in the partial area and also detect a gesture in the same area.

According to one embodiment, the second distributed control device is configured to detect the predetermined gesture and to generate the gesture signal. Thus, the first and the second distributed control device may be configured to cooperate in the partial detect mode to detect a gesture.

According to one embodiment, the partial area is a corner of the touch surface. According to another embodiment, the partial area is an area of the touch surface with a size adapted to the size of an area of a fingerpad. Thus, only a limited area of the touch surface has to be sensitive to touches.

According to one embodiment, the first emitter is configured to emit light along a detection line being reflected in the partial area of the touch surface. Thus, the partial area will be sensitive to a gesture. The first emitter may e.g. be configured to emit light along a detection line that hits a central point of the dedicated partial area. If the partial area is small enough, the user will be guided to touch the partial area and then attenuate the light, even if light is emitted along only one detection line.

According to one embodiment, the first emitter is configured to emit light in a predetermined emission angle $\alpha$ adapted to a distance between the first emitter and the partial area such that the emitted light is reflected in a certain area of the partial area. Thus, a dedicated area for detecting a touch and/or gesture is covered.

According to one embodiment, the first distributed control device is configured to control the first emitter to emit light with an energy adapted to the partial detect mode. As the distance that has to be covered by the emitted light is short, the light can be emitted with less energy than in a normal mode and still be used for detecting a touch.

The predetermined gesture may be characterized by a touch of a touching object at the partial area.

According to one embodiment, the main control unit is configured to activate a feature of the touch sensitive system in response to receiving a gesture signal. For example, activate a feature comprises changing the mode of the touch sensitive system from the partial detect mode to a normal mode, wherein the main control unit is configured to change mode from the power saving mode to a normal mode. Thus, the main control unit may be waken up when a predetermined gesture is detected.

According to another embodiment, a remaining of the distributed control devices which were not active in the partial detect mode are configured to be activated in response to receiving a gesture signal, or an activation signal. Thus, the first or the second of the distributed control devices may wake up the other distributed control devices such that the touch sensitive system may detect a touch over the whole touch surface.

According to one embodiment, the touch sensitive system is based on Frustrated Total Internal Reflection, FTIR.

According to a second aspect, the object is at least partly achieved by a method for activating a feature of a touch sensitive system. The touch sensitive system comprises a touch sensitive panel defining a touch surface and a main control unit configured to control a plurality of distributed control devices each configured to control operation of a segment of emitters and detectors, wherein each emitter is configured to emit light into the panel for propagation in the panel and each detector is configured to detect the light propagating in the panel. The method comprising:
  setting the touch sensitive system in a partial detect mode in which mode a first of the distributed control devices is active;
  controlling a first emitter to emit light in a partial region of the panel coincident with a partial area of the touch surface;
  detecting a predetermined gesture in the partial area of the touch surface;
  generating a gesture signal indicating the predetermined gesture;
  activating a feature of the touch sensitive system in accordance with the predetermined gesture.

According to one embodiment, the method comprises setting the main control unit in a low power mode when the touch sensitive system is set in the partial detect mode.

According to one embodiment, the method comprises controlling the first emitter to emit light with an energy adapted to the partial detect mode.

According to one embodiment, the distributed control devices are grouped into at least one group. The method may comprise setting the touch sensitive system in a partial detect mode in which mode also a second of said distributed control devices is active, wherein the first and the second distributed control device belongs to the same group. The second distributed control device may then perform the steps of detecting a predetermined gesture and generating a gesture signal.

According to another embodiment, the first distributed control device performs the steps of detecting a predetermined gesture and generating a gesture signal.

According to another embodiment, the method comprises if a predetermined gesture is detected, activating a remaining of the distributed control devices which were not active in the partial detect mode.

According to one embodiment, the method comprising sending the gesture signal to the main control unit and activating a feature comprises changing the mode of the touch sensitive system from the partial detect mode to a normal mode.

According to a third aspect the object is at least partly achieved by a computer-readable medium comprising computer instructions configured to cause a processor to execute the method according to any of the steps as herein described.

Preferred embodiments are set forth in the dependent claims and in the detailed description.

SHORT DESCRIPTION OF THE APPENDED DRAWINGS

Below the invention will be described in detail with reference to the appended figures, of which.

DETAILED DESCRIPTION OF PREFERRED EMBODIMENTS OF THE INVENTION

Figure 1A:
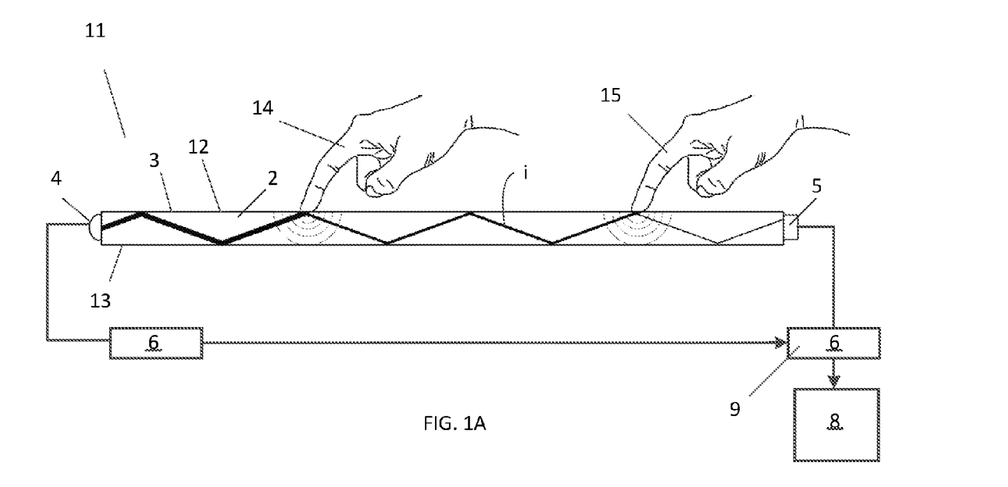
FIG. 1A illustrates a side view of a touch arrangement based on FTIR.
Figure 1B:
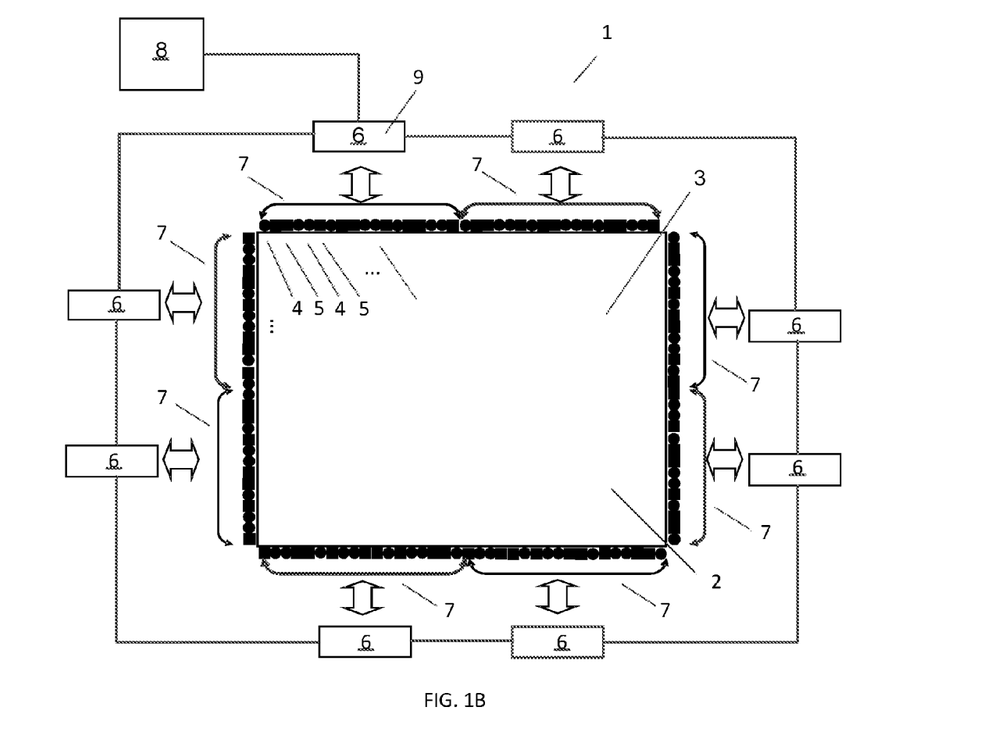
FIG. 1B illustrates a touch sensitive system based on FTIR according to some embodiments of the invention.

FIG. 1A-1B illustrates a side view and a top view of an example embodiment of a touch-sensitive system 1 that is based on the concept of FTIR (Frustrated Total Internal Reflection), also denoted "FTIR system". The touch arrangement 11 operates by transmitting light inside a touch sensitive panel 2, from light emitters 4 to light sensors or detectors 5, so as to illuminate a touch surface 3 from within the panel 2. The panel 2 is made of solid material in one or more layers and may have any shape. The panel 2 defines an internal radiation propagation channel, in which light propagates by internal reflections. In the example of FIG. 1A, the propagation channel is defined between two boundary surfaces 12, 13 of the panel 2, where a top surface 12 allows the propagating light to interact with touching objects 14, 15 and thereby defines the touch surface 3. This is achieved by injecting the light into the panel 2 such that the light is reflected by total internal reflection (TIR) in the touch surface 3 as it propagates through the panel 2. The light may be reflected by TIR in the bottom surface 13 or against a reflective coating thereon. It is also conceivable that the propagation channel is spaced from the bottom surface 13, e.g. if the panel 2 comprises multiple layers of different materials. The panel 2 may be designed to be overlaid on or integrated into a display device or monitor.

The system 1 allows one or several objects 14, 15 that is brought into close vicinity of, or in contact with, the touch surface 3 to interact with the propagating light at the point of touch. In this interaction, part of the light may be scattered by the object 14, 15, part of the light may be absorbed by the object 14, 15, and part of the light may continue to propagate in its original direction across the panel 2. Thus, the touching object 14, 15 causes a local frustration of the total internal reflection, which leads to a decrease in the energy (power/intensity) of the transmitted light, as indicated by the thinned lines downstream of the touching objects 14, 15 in FIG. 1A. If two objects 14 and 15 happen to be placed after each other along a light path i from an emitter 4 to a detector 5, part of the light will interact with both these objects 14, 15. Provided that the light energy is sufficient, a remainder of the light will interact with both objects 14, 15 and an output signal will be generated that allows both interactions (touch inputs) to be identified. The output signal is received to a distributed control device 6, which may process the output signal before it is sent to a main control unit 8. Here, another distributed control device 6 controls the emitter 4 to emit light into the panel 2.

Figure 1C:
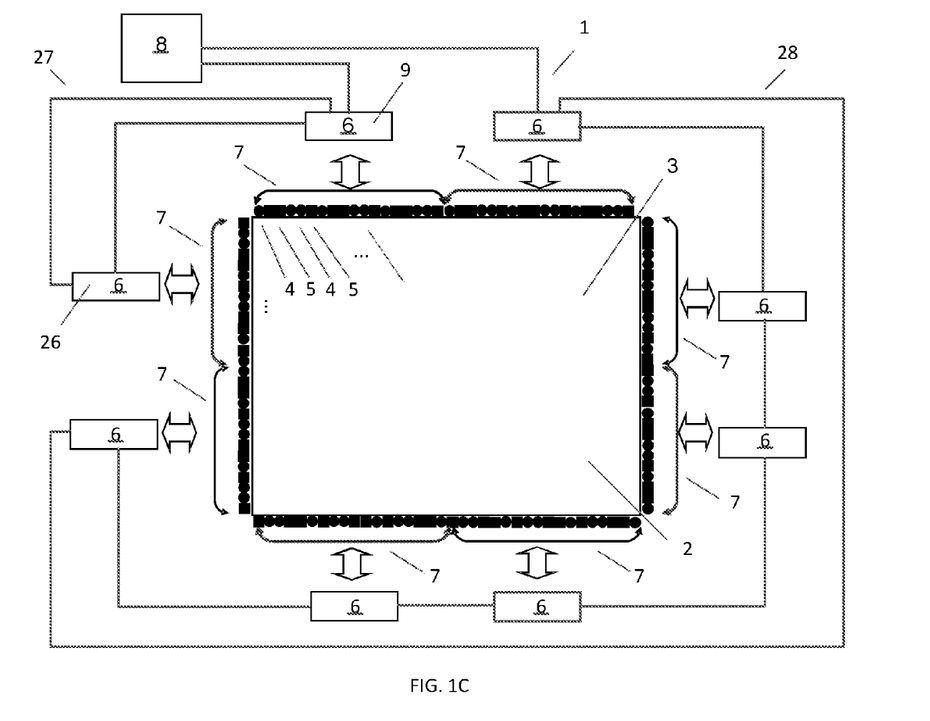
FIG. 1C illustrates a touch sensitive system based on FTIR according to some other embodiments of the invention.

The emitters 4 are distributed along the perimeter of the panel 2 to generate a corresponding number of light sheets inside the panel 2. Each emitter 4 generates a beam of light that expands in the plane of the panel 2 while propagating in the panel 2. Each beam propagates from one or more entry or incoupling points on the panel 2. The detectors 5 are distributed along the perimeter of the panel 2 to receive the light from the emitters 4 at a number of spaced-apart outcoupling points on the panel 2. It should be understood that the incoupling and outcoupling points merely refer to the position where the beam enters and leaves, respectively, the panel 2. Thus, one emitter/detector may be optically coupled to a number of incoupling/outcoupling points in the panel 2. The emitters 4 and detectors 5 may be implemented in a printed circuit board (PCB) around the periphery of the panel 2. As illustrated in FIGS. 1B and 1C, the emitters 4 and detectors 5 distributed around the panel 2 are divided into segments 7, where the emitters 4 and detectors 5 in each segment 7 are electrically connected to a distributed control device 6. The emitters 4 and detectors 5 may be equally divided into the segments 7, such that each segment 7 includes the same number of emitters 4 and detectors 5. The touch sensitive system 1 thus comprises a plurality of distributed control devices 6 each configured to control operation of a segment 7 of emitters 4 and detectors 5.

Each emitter 4 is configured to emit light in any of the visible, infrared or ultraviolet spectral regions. Each detector 5 is configured to receive the light and generate a light signal in any of these regions.

The distributed control devices 6 can be divided into one or several groups. In FIG. 1B, all the distributed control devices 6, here a number of eight, are grouped into the same group. In FIG. 1C, the eight distributed control devices 6 are instead divided in a first and a second group 27, 28, with two control devices 6 in the first group 27 and six in the second group 28. The control devices 6 can be divided into more groups if appropriate. The distributed control devices 6 in each group are preferably connected in series to minimize the need for cables, and communicate serially with each other. One distributed control device 6 in each group is operatively connected directly to a main control unit 8 and this control device 6 is a master over the other distributed control devices 6 in the group. One purpose of dividing the distributed control devices 6 into several groups is to be able to limit the number of control devices 6 that are active.

The main control unit 8 is configured to control the distributed control devices 6 via the control device 6 acting as master, here called "master". The master may be configured to send an activation signal to the remaining distributed control devices 6 which are not active to thereby activate them. The activation signal may include a synchronisation signal to synchronize processor clocks in the distributed control devices 6. In this way the control devices 6 will operate in the same time frame such that they can operate in synchronization.

The control devices 6 control the emitters 4 and the detectors 5 according to one or several schemes. The control devices 6 are acting according to the same scheme such that all the emitters 4 and detectors 5 around the panel 2 are acting in common. According to one embodiment, a segment 7 of emitters 4 and detectors 5 is chosen such that the emitters 4 and the detectors 5 in the segment 7 do not need to emit and detect at the same time. This is advantageous, as detection values and/or signals in a control device 6 might become disturbed by disturbances introduced by large currents in the control device 6 when light is controlled to be emitted by the same. For example, if the panel 2 has a rectangular shape, the emitters 4 and detectors 5 in a segment 7 may be distributed along only one of the sides of the panel 2 as illustrated in FIGS. 1B and 1C. Then the emitters 4 and the detectors 5 in a segment 7 do not have to emit and detect at the same time to cover the touch surface 3.

In FIG. 1B, a first distributed control device 9 of the distributed control devices 6 is operatively connected directly to the main control unit 8. The first control device 9 is thus the master. The remaining distributed control devices 6 are connected in series to the first control device 9. In a partial detect mode which will be explained in the following, it is in this embodiment only the first distributed control device 9 that is active.

In FIG. 1C, the first group 27 includes the first and a second distributed control device 9, 26. In the figure it is illustrated that it is the first control device 9 that is operatively connected to the main control unit 8, and the first control unit 9 is thus the master. One of the first and second control device 9, 26 is configured to control one or several connected emitters 4 to emit light, and the other one of the first and second control device 9, 26 is configured to detect the emitted light via one or several detectors 5. The other one of the distributed control devices 9, 26 is then configured to detect the predetermined gesture and to generate the gesture signal. In the second group 28 another distributed control device 6 is the master, and the remaining control devices 6 in the second group 28 are connected in series to the master. The master is operatively connected directly to the main control unit 8. In partial detect mode, both the first and the second distributed control devices 9, 26 are active, while the distributed control devices 6 in the second group 28 are not active. It is understood that the distributed control devices 6 may be divided into more groups and that more than one group may be active at the same time. For example, the distributed control devices 6 may be divided into a further third group, similar to the first group, with two distributed control devices 6. Then, in partial detect mode, the distributed control devices 6 in the first and the third groups may be active, while the remaining control devices 6 in the second group are not active.

The group or groups that are active may then sense touches on one or several partial areas 22 of the touch surface 3. Thus, energy can be saved compared to having all the distributed control devices 6 activated.

Figure 2:
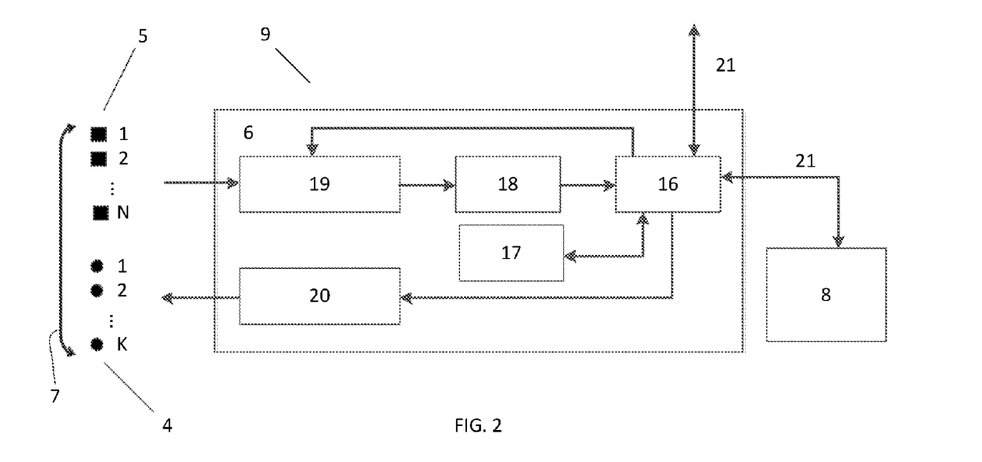
FIG. 2 illustrates a control device according to some embodiments of the invention.

In FIG. 2 an example of a distributed control device 6 is illustrated. In one implementation the control device 6 is an integrated circuit such as an ASIC (Application Specific Integrated Circuit). The ASICs are then integrated in a PCB (Printed Circuit Board) around the periphery of the panel 2 together with the emitters 4 and detectors 5. The control device 6 comprises a processing unit 16 and a computer readable storage medium 17. The processing unit 16 may be a computer programmable unit (CPU) of 1-100 MIPS (Million instructions per second), preferably 10-50 MIPS. The computer readable storage medium 17 may have a storage capacity of 1-64 KB, preferably 8-50 KB. The processing unit 16 is connected to an emitter control unit 20 configured to control the 1-K emitters 4 in a segment 7 to emit light according to a scheme. Alternatively the control unit 20 is integrated in the processing unit 6. The processing unit 16 is further connected to a detector control unit 19 configured to control the 1-N detectors 5 in the same segment 7. Light from the panel 2 is detected by one or several detectors 5 in the same segment 7 and received to the detector control unit 19 where a light signal is created. The detector control unit 19 is connected to an analogue to digital (A/D) converter unit 18 where the light signal is digitalized into light data before it is received to the processing unit 16. The light data may be processed before it is sent as one or several output signals or as light data to the main control unit 8. For example, the control device 6 may be configured to compensate the received light for ambient light. The control device 6 may store an ambient background profile of the light data, and compensate the light data with the ambient background profile. The ambient background profile may be continuously updated.

If the distributed control device 6 is not a master, the output signal(s) are sent to the main control unit 8 via the master and via intermediate distributed control device 6, if any. The distributed control device 6 in FIG. 2 is a master and is thus operatively connected directly to the main control unit 8, here via a signal line. Signal lines may also go to and from the distributed control device 6 to the other distributed control devices 6.

One or several schemes can be loaded into the computer readable storage medium 17 as computer instructions operable to cause the processing unit 16 to perform various operations. For example, at start up of the touch sensitive system 1, the main control unit 8 may be configured to send one or several schemes to the distributed control devices 6, whereby the one or several schemes are loaded into their respective computer readable storage medium 17. Light is emitted and detected with a certain frame rate which can be adapted to the partial detect mode. Within a frame light is both emitted and detected.

The touch sensitive system 1 is configured to be set in a partial detect mode. In the partial detect mode, the first 9 of the distributed control devices is configured to be active. This mode may be initiated when there has been no touch on the touch surface 3 for a certain time, or if a user actively sets the system 1 in the mode by e.g. interacting with the touch surface 3 in a certain way. The main control unit 8 may be configured to be set in a low power mode when the touch sensitive system 1 is set in the partial detect mode. When the touch sensitive system 1 is set in a partial detect mode, the main control unit 8 may be configured to send a partial detect mode signal to the first control unit 9, which in response deactivates the other distributed control devices 6. Preferably the first control unit 9 also deactivates the emitters 4 and detectors 5 connected to the first control unit 9 which are not used in the partial detect mode. If more than one group, the main control unit 8 may be configured to send a partial mode signal to each of the masters of the control devices 6, which in response will deactivate or activate the control devices 6 in its group according to predefined rules for the partial detect mode. For example, a second distributed control device 26 belonging to the same group as the first distributed control device 9 may be configured to also be active in the partial detect mode. Any of the activated first or second distributed control devices 9, 26 may be configured to generate a gesture signal 21.

Figure 3:
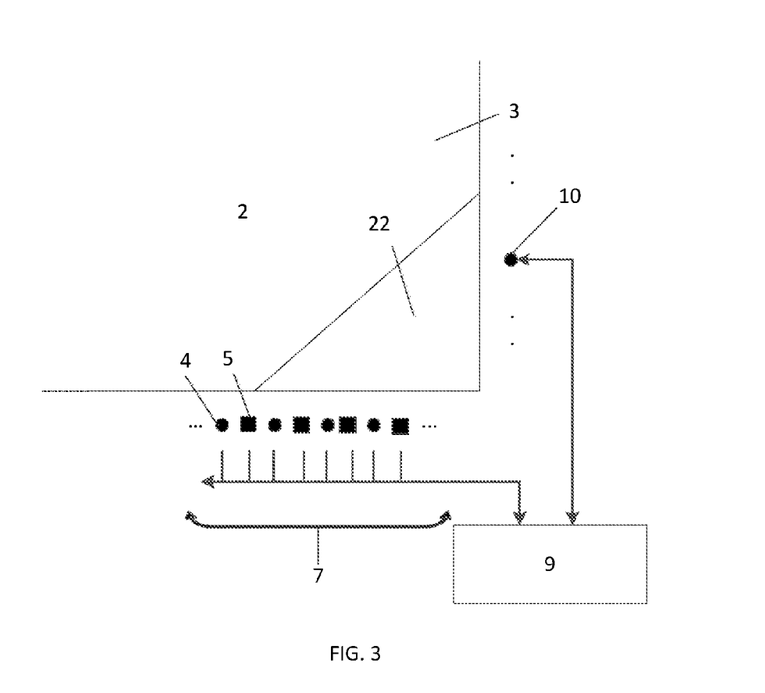
FIGS. 3-4 are schematic views of different embodiments of the invention.

In FIG. 3 one embodiment is shown where a first emitter 10 is located close to a corner of the panel 2. An area of the touch surface 3 limited by the corner defines a partial area 22, here in the shape of a triangle. The partial area 22 is thus a corner of the touch surface 3. The first emitter 10 is connected to the first distributed control device 9, and the first emitter 10 is configured to be controlled by the same. In the partial detect mode the first distributed control device 9 is configured to control the first emitter 10 to emit light in a partial region of the panel 2 coincident with the partial area 22 of the touch surface 3. The first distributed control device 9 is further electrically connected to a segment 7 of emitters 4 and detectors 5. At least one detector 5 in the segment 7 has an optical path to the panel 2 such that a detection line is defined from the first emitter 10 to the detector 5. According to one embodiment a plurality of detectors 5 are used to detect the light emitted from the first emitter 10 along a plurality of detection lines to cover a larger partial area 22. Thus, in the partial detect mode, the first distributed control device 9 controls the first emitter 10 to emit light into the panel 2, and the light is detected by one or several of the detectors 5 and sent to the processing unit 16 (FIG. 2) of the first distributed control device 9. If a user makes a predetermined gesture on the partial area 22, this gesture can be detected by the processing unit 16 by analysing the light received from the detector(s) 5.

The segment 7 of emitters 4 and detectors 5 are located along a first side of the panel 2, and the first emitter 10 is located along a second side at an angle to or parallel to the first side. The first and second side are according to one embodiment arranged perpendicular to each other. The partial area 22 is here limited by the first and second sides. The first emitter 10 may be an extra emitter 10 not being one of the number of emitters 4 and detectors 5 belonging to the segment 7. In the figure only a first emitter 10 is illustrated, but it is understood that the embodiment may encompass a plurality of first emitters 10, e.g. two or three, also connected to the first distributed control device 9 and configured to emit light in the partial region of the panel 2 coincident with the partial area 22 of the touch surface 3. It is also understood that the first emitter 10 instead may be one of the emitters 4 in the segment 7 located along the first side of the panel 2, and that one or several detectors 5 may be located along the second side of the panel 2. The one or several detectors 5 located along the second side of the panel 2 may be extra detectors that are only used in partial detect mode.

Instead of using only one distributed control device 6 as in FIG. 3, the configuration of a first group 27 of two distributed control devices 6 illustrated in FIG. 1C can be used. Then, the first emitter 10 (or several first emitters 10) may be controlled by the first distributed control device 9, and the detectors 5 may be controlled by the second distributed control device 26.

Figure 4:
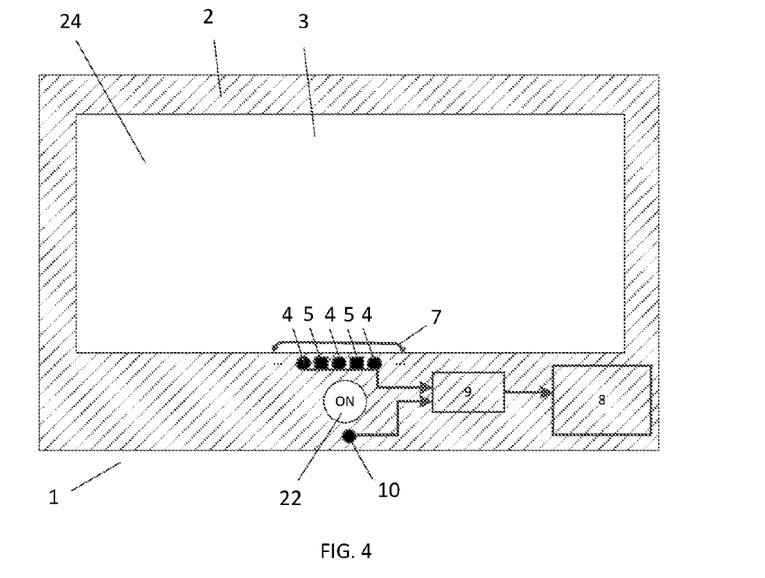

In FIG. 4 a further embodiment of the touch system 1 is shown where a first emitter 10 is located close to a partial area 22 of the touch surface 3, here in the shape of a circle 22. The partial area 22 may have any other size, such as rectangular, triangular etc. The partial area 22 may be an area of the touch surface 3 with a size adapted to the size of an area of a fingerpad. The size of the partial area 22 may be large enough such that a touch of a fingerpad can be detected, but small enough such that the area for detection becomes limited. The first emitter 10 is connected to the first distributed control device 9, and the first emitter 10 is configured to be controlled by the same. In the figure the panel 2 is shown where part of the upper surface 12 and part of the touch surface 3 are being covered with a filter, e.g. black colour, here illustrated in a lattice to be able to illustrate components of the system 1.

As in the embodiment illustrated in FIG. 3, in the partial detect mode, the first distributed control device 9 is configured to control the first emitter 10 to emit light in the partial region of the panel 2 coincident with the partial area 22 of the touch surface 3. The first distributed control device 9 is also electrically connected to a segment 7 of emitters 4 and detectors 5. According to one embodiment, at least one detector 5 in the segment 7 has an optical path to the panel 2 such that light emitted along a detection line from the first emitter 10 will be detected by the detector 5. The detector 5 is then configured to detect light reflected both in a main touch surface 24 and light reflected in the partial area 22. A plurality of detectors 5 may be used to detect the light emitted from the first emitter 10. Thus, in the partial detect mode, the first distributed control device 9 controls the first emitter 10 to emit light into the panel 2 in the partial region of the panel 2 coincident with the partial area 22. The light is detected by one or several of the detectors 5 whereby at least one light signal is generated indicating the detected light. The light signal is then sent to the processing unit 16 (FIG. 2) of the first distributed control device 9. If a user makes a predetermined gesture on the partial area 22, this gesture can be detected by the processing unit 16 by analysing the light signal received from the detector(s) 5.

It is also understood that the first emitter 10 instead may be one of the emitters 4 in the segment 7, and that one or several extra detectors may be located on the opposite side of the partial area 22 where the first emitter 10 now is located in FIG. 4.

The partial area 22 of the touch surface 3 is according to one embodiment marked-up on the touch surface 3 such that it is obvious for the user where to make a gesture. The area 22 may e.g. be marked with the text "ON", with a line surrounding the area 22 or with another marking.

The predetermined gesture may be characterized by a touch of a touching object 14 at the partial area 22. Other more complex gestures may be defined, e.g. a touch and a pressure, or dragging the touching object 14 a small distance. The touching object 14 may be a finger or a pointing device. Any of the active control devices 6, e.g. the control device 6 detecting the light, is configured to analyse the detected light after it has been digitalized and to determine if a predetermined gesture has been detected. If the predetermined gesture is a single touch the analysis may be performed by comparing the signal level of the received light with a previously determined signal level of the received light. If an attenuation of the light can be determined, a touch has been detected. In this case it is not necessary to extract any details such as the position etc of the touch, as the first control device 9 only emits light to the partial area 22. Thus, the analysis can be kept relatively simple and energy saving. The received light is preferably also compensated for ambient light. This can be made by determining an ambient profile of the light and compensating the received light with the ambient light profile. The ambient light profile may be determined by the control device 6, or may be a previously ambient light profile determined by the main control unit 8. The ambient light profile is preferably continuously updated. The control device 6 detecting the light may be configured to detect more advanced gestures such as a pressure, or a dragging touch. In the Swedish application 1251014-5 it is explained how a pressure of a touch can be determined in an FTIR-system, and the context of the application is hereby incorporated by reference. In this application it is also explained how a pattern of a touch can be determined by establishing a trace of the touch. The trace comprises e.g. positions and an identity for the touch. As long as the touching object 14 touches the touch surface 3, positions for the touching object 14 with the same identity can be detected. When the touching object 14 is lifted from the touch surface 3 there will not be any more positions with this identity. The trace will show a pattern, which can be compared with patterns identifying predetermined gestures. If a time aspect is introduced, a velocity for the trace can also be determined to distinguish a gesture.

For detecting a touch on the main touch surface 24 in a normal mode, the signal to noise ratio $$\frac{s}{n}$$

preferably should be as large as possible to be able to retrieve desired information from the touch. In a partial detect mode, the signal to noise ratio can be lower as less information has to be retrieved about the touch. For example, the emitted light can be emitted with a lower intensity, and/or the ambient light compensation can be made in a simpler way than in a normal mode.

If a predetermined gesture on the partial area 22 of the touch surface 3 is detected, the control unit detecting the light is configured to generate a gesture signal indicating the predetermined gesture. The gesture signal can be sent to the main control unit 8 whereby the main control unit 8 is configured to activate a feature of the touch sensitive system 1. To activating a feature may then comprise changing the mode of the touch sensitive system 1 from the partial detect mode to a normal mode, wherein the main control unit 8 is configured to change mode from the power saving mode to a normal mode. Thus, the main control unit 8 can be activated by making a gesture in the partial area 22.

To activate a feature may instead comprise sending the gesture signal to the remaining distributed control devices 6 not being active in partial detect mode, whereby the remaining distributed control devices 6 are configured to be activated. If the distributed control devices 6 are grouped into different groups, the gesture signal may be sent via the main control unit 8 to the remaining distributed control devices. The gesture signal may have the same content as the previously mentioned activation signal, and will then synchronize processor clocks in the distributed control devices 6. The distributed control devices 6 will then control their respective emitters 4 to emit light and their respective detectors 5 to detect light such that one or several touches can be detected over the whole touch surface 3. The system 1 may now await a touch on the main touch surface 24 before the main control unit 8 is activated. As the distributed control devices 6 may be configured to make some analysis of the detected light, a single touch may e.g. be detected by the distributed control devices 6. If an interaction, i.e. a touch on the main touch surface 24 that affects a detected parameter, is detected, this information is distributed to the master of the group which then will send a wake-up signal indicating the touch data to the main control unit 8 which will activate the same.

It is of course possible to simultaneously activate the distributed control devices 6 and the main control unit 8. This can be accomplished by sending the gesture signal to both the distributed control devices 6 and to the main control unit 8.

If the touch sensitive panel 2 is overlaid on or integrated into a display device, the gesture in the partial area 22 may invoke a feature visible on the display device. This feature may include showing a graphical item on a graphical user interface, GUI, of the display device, such as a "menu", or initiating the function of "return" and thus go to a higher level in the GUI-environment or return to a previous shown view. To invoke these features, the main control unit 8 has to be involved and be configured to communicate with the display device. Thus, the gesture signal may both wake up the main control unit 8 and invoke a feature visible on the display device. Different gestures can be used to invoke different features visible on the display device.

Figure 5:
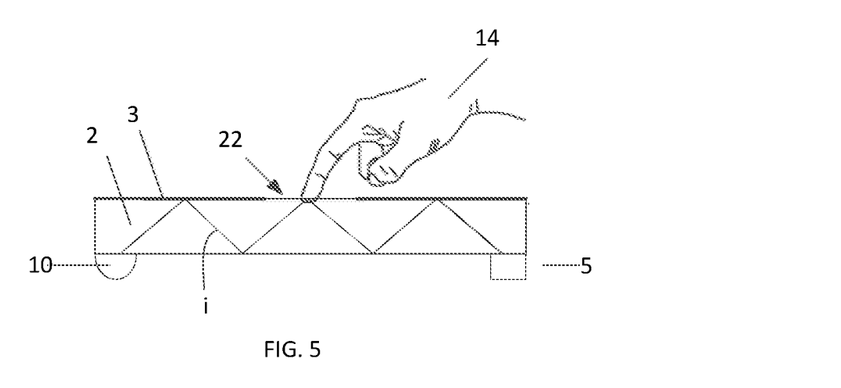
FIG. 5 illustrates how emitted light is reflected in a partial area of the touch surface.

In FIG. 5 it is illustrated how light is emitted into the touch sensitive panel 2 such that light is reflected to the touch surface 3 whereby a touching object 14 has a chance to attenuate the light. The first emitter 10 is thus configured to emit light along a detection line being reflected in the partial area 22 of the touch surface 3. A detection line is defined as a path of the light emitted from an emitter 10 and detected by a detector 5. If several first emitters 10 and/or several detectors are used, more detection lines can be had on the partial area 22. The touch surface 3 is here partly covered with a filter, e.g. black colour, which is removed in the partial area 22.

Figure 6A:
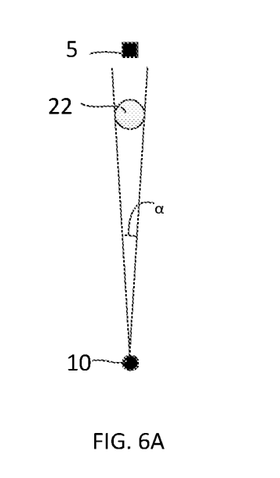
FIGS. 6A-6B are showing emitters emitting light with various emitting angles.
Figure 6B:
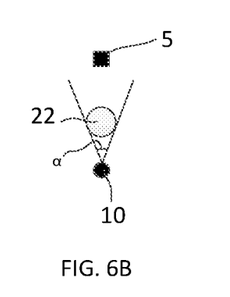
Figure 6C:
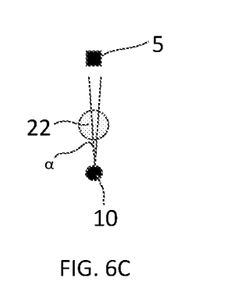

In FIGS. 6A-6C it is illustrated that the placement of the first emitter 9 in relation to the partial area 22 may have an impact on how large part of the partial area 22 that will be covered by the emitted light. The first emitter 10 may emit light in an emission angle $\alpha$. The further away the first emitter 10 is located from the partial area 22, the greater the energy of the emitted light has to be to reach the detector 5 also after it has become attenuated. However, the further away from the partial area 22, the smaller the size of the emission angle $\alpha$ to cover the same partial area 22, thus the light can be emitted with less energy. This relationship is illustrated in FIGS. 6A and 6B, where in FIG. 6A the first emitter 10 is located a first distance from the partial area 22, and the emission angle is small to cover the partial area 22. In FIG. 6B the first emitter 10 is located a second distance from the partial area, where the second distance is smaller than the first distance, and the emission angle $\alpha$ here has to be greater to cover the same partial area 22 as in FIG. 6A.

If the partial area 22 has a size that is small enough such that a fingerpad touching the partial area 22 always will cover at least half the area 22, the emission angle $\alpha$ can be kept small such that the centre of the area 22 is covered, but not the whole partial area 22. This embodiment is illustrated in FIG. 6C, where the first emitter 10 is placed close to the partial area 22 and emits light in a small emission angle $\alpha$ such that the centre of the partial area 22 will be covered by the emitted light. Thus, the first emitter 10 is configured to emit light in a predetermined emission angle $\alpha$ adapted to a distance between the first emitter 10 and the partial area 22 such that the emitted light is reflected in a certain area of the partial area 22. If a greater emission angle $\alpha$ is used, more detectors 5 or a detector 5 covering a larger area may be used to detect light from the wider angle α.

As the distance between the first emitter 10 and the detector 5 is small, the energy of the emitted light can be kept small compared to the energy needed for emitting light over the main touch surface 24. The first distributed control device 9 may thus be configured to control the first emitter 10 to emit light with an energy adapted to the partial detect mode. The energy of the emitted light may be predetermined, or may be adapted during running.

The first distributed control device 9 may be configured to regulate the energy transmitted by the first emitter 10, such that the received energy by the detector 5 is sufficient to be able to determine a touch in the dedicated area. This can be done be comparing the present signal to noise ratio with a predetermined signal to noise ratio necessary for detecting a gesture, e.g. a touch, and regulate the energy of the light to an appropriate level based on the result of the comparison. This may be advantageous e.g. if the first emitter 10 has been previously used for emitting light over the main touch surface 24 and now shall be used in the partial detect mode, and/or if the partial area 22 comprises e.g. contaminations on the surface 3 which disturb the propagating light. Light can then be emitted into the panel 2 with an optimal amount of energy for detecting a touch in the partial area 22 such that energy can be saved.

Figure 7:
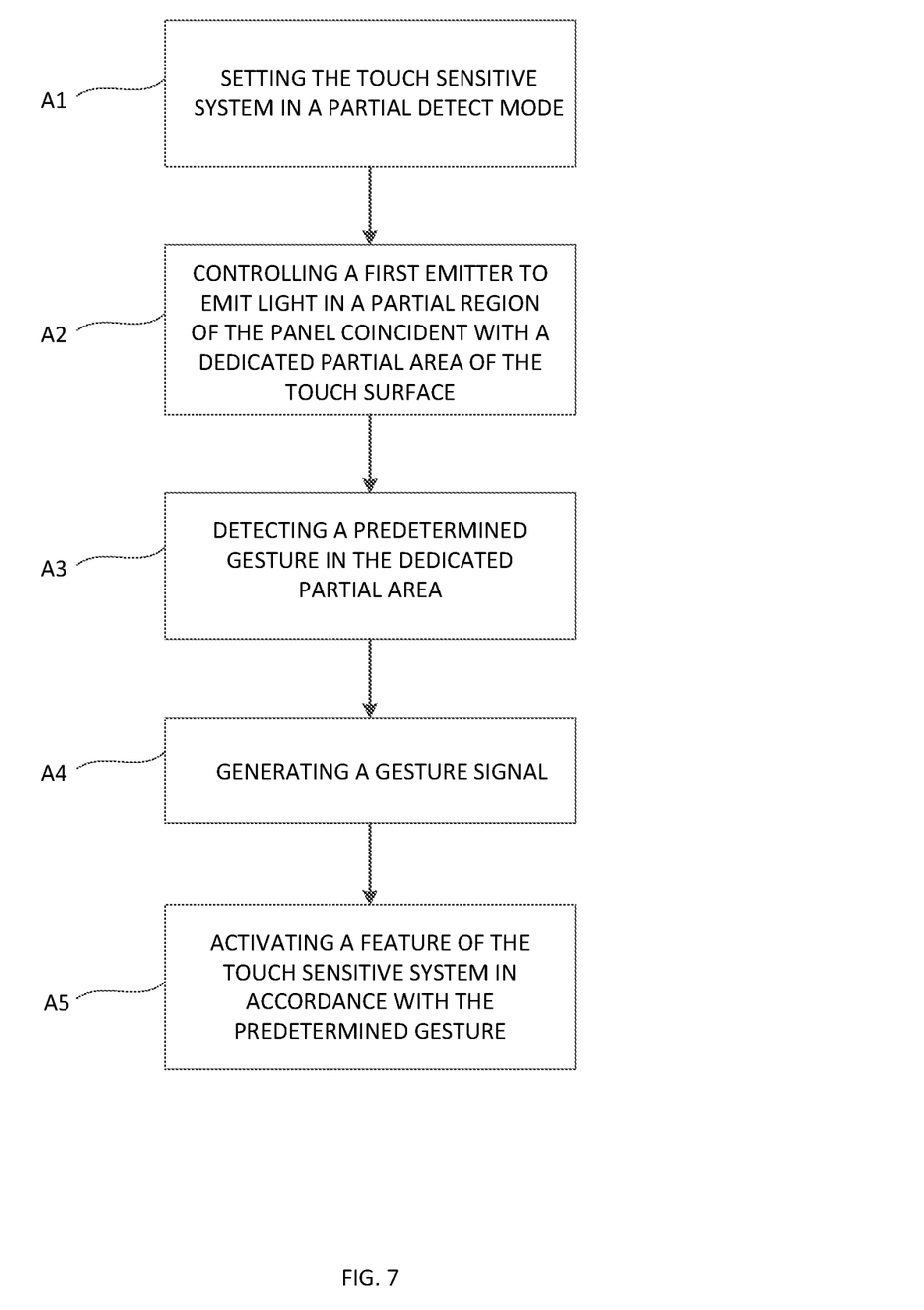
FIG. 7 is a flowchart of a method for activating a feature of a touch sensitive system.

A method for activating a feature of the described touch sensitive system 1 will know be described with reference to the flowchart in FIG. 7. The method comprises setting the touch sensitive system 1 in a partial detect mode in which mode a first 9 of the distributed control devices 6 is active (A1). As explained with the system 1, instead two or three first distributed control devices 9 may be activated in partial detect mode. When setting the touch sensitive system 1 in the partial detect mode, the main control unit 8 may simultaneously be set in a low power mode to save energy. A first emitter 10 is controlled to emit light in a partial region of the panel 2 coincident with a partial area 22 of the touch surface 3 (A2). The first emitter 10 may be configured to emit light with an energy adapted to the partial detect mode. A user then makes a predetermined gesture on the partial area 22, and the method continues with detecting the predetermined gesture in the partial area 22 (A3). A gesture signal 21 is then generated indicating the predetermined gesture (A4) and thereafter a feature of the touch sensitive system 1 is activated in accordance with the predetermined gesture (A5). The steps A4 and A5 may include sending the gesture signal 21 to the main control unit 8 and activating a feature comprises changing the mode of the touch sensitive system 1 from the partial detect mode to a normal mode. The steps A4 and A5 may instead or also include activating the other distributed control devices 6 if a predetermined gesture is detected.

The distributed control devices are divided into at least one group. The step A1 of the method may comprise setting the touch sensitive system 1 in a partial detect mode in which mode also a second 26 of the distributed control devices 6 is active, wherein the first and the second distributed control devices 9, 26 belongs to the same group. The second distributed control device 26 may then perform the steps of A3 of detecting a predetermined gesture and A4 of generating a gesture signal.

Instead, the first distributed control device 9 may perform the steps of detecting a predetermined gesture (A3) and generating a gesture signal (A4).

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A touch sensitive system comprising:
a touch sensitive panel defining a touch surface;
a plurality of emitters configured to emit light across the touch surface;
a plurality of detectors configured to detect the light;
a plurality of distributed control devices, wherein each of the plurality of distributed control devices is configured to control operation of a respective segment of the plurality of emitters and the plurality of detectors;
a main control unit connected with the plurality of distributed control devices;
wherein during a partial detect mode, a first subset of said plurality of distributed control devices are activated and wherein the first distributed control device in the first subset is configured to control a first set of emitters to emit light across a partial area of said touch surface; and
wherein the first distributed control device is further configured to:
detect a predetermined gesture on the partial area of said touch surface; and
generate a gesture signal indicating the predetermined gesture,
wherein a remaining set of distributed control devices which were not active in the partial detect mode are configured to be activated in response to receiving the gesture signal.

2. The touch sensitive system according to claim 1, wherein said main control unit connected to the plurality of distributed control devices is set in a low power mode when the touch sensitive system is set in said partial detect mode.

3. The touch sensitive system according to claim 1, wherein each distributed control device comprises a processing unit and a computer readable storage medium.

4. The touch sensitive system according to claim 1, wherein the distributed control devices are grouped into at least one group.

5. The touch sensitive system according to claim 4, wherein the distributed control devices in each group are connected in series.

6. The touch sensitive system according to claim 4, wherein only one distributed control device in each group is operatively connected directly to the main control unit.

7. The touch sensitive system according to claim 4, wherein a second of the distributed control devices is configured to be active in the partial detect mode, wherein the first and the second distributed control devices are grouped into the same group.

8. The touch sensitive system according to claim 7, wherein the second distributed control device is configured to detect a predetermined gesture and to generate a gesture signal.

9. The touch sensitive system according to claim 1, wherein the first distributed control device is configured to detect a predetermined gesture and to generate a gesture signal.

10. The touch sensitive system according to claim 1, wherein the partial area is a corner of the touch surface.

11. The touch sensitive system according to claim 1, wherein the partial area is an area of the touch surface with a size adapted to the size of an area of a fingerpad.

12. The touch sensitive system according to claim 1, wherein the first emitter is configured to emit light along a detection line being reflected in the partial area of the touch surface.

13. The touch sensitive system according to claim 1, wherein the first emitter is configured to emit light in a predetermined emission angle a adapted to a distance between the first emitter and the partial area such that the emitted light is reflected in a certain area of the partial area.

14. The touch sensitive system according to claim 1, wherein the first distributed control device is configured to control the first emitter to emit light with an energy adapted to the partial detect mode.

15. The touch sensitive system cording to claim 1, wherein said predetermined gesture is characterized by a touch of a touching object at the partial area.

16. The touch sensitive system according to claim 1, wherein the main control unit connected to the plurality of distributed control devices activates a feature of the touch sensitive system in response to receiving a gesture signal.

17. The touch sensitive system according to claim 16, wherein activate a feature comprises changing the mode of the touch sensitive system from said partial detect mode to a normal mode, wherein the main control unit is connected to the plurality of distributed control devices to chance mode from said power saving mode to a normal mode.

18. The touch sensitive system according to claim 1, wherein said touch sensitive system is based on Frustrated Total Internal Reflection, FTIR.

19. A method for activating a feature of a touch sensitive system comprising a plurality of distributed control devices connected with a main control unit, the method comprising:
    emitting light from a plurality of emitters across a touch surface;
    detecting the emitted light at a plurality of detectors;
    controlling, with the plurality of distributed control devices, operation of the plurality of emitters and the plurality of detectors;
    activating a first subset of the plurality of distributed control devices in a partial detect mode;
    detecting, with a first distributed control device, a predetermined gesture on a partial area of said touch surface; and
    generating, with the first distributed control device in the first subset, a gesture signal indicating the predetermined gesture;
    wherein a remaining set of distributed control devices which were not active in the partial detect mode are activated in response to receiving the gesture signal.

* * * * *